US007143641B2

(12) United States Patent
Palazzolo et al.

(10) Patent No.: US 7,143,641 B2
(45) Date of Patent: Dec. 5, 2006

(54) FLUID TEST MACHINE, METHODS AND SYSTEMS

(75) Inventors: Frank Palazzolo, Sterling Heights, MI (US); Michael Schena, Rochester Hills, MI (US)

(73) Assignee: Michigan Custom Machines, Inc., Farmington Hills, MI (US)

( * ) Notice: Subject to any disclaimer, the term of this patent is extended or adjusted under 35 U.S.C. 154(b) by 0 days.

(21) Appl. No.: 11/029,718

(22) Filed: Jan. 5, 2005

(65) Prior Publication Data

US 2005/0172705 A1 Aug. 11, 2005

Related U.S. Application Data

(60) Provisional application No. 60/535,456, filed on Jan. 9, 2004, provisional application No. 60/602,102, filed on Aug. 17, 2004.

(51) Int. Cl.
*F02M 65/00* (2006.01)
*G01M 15/00* (2006.01)

(52) U.S. Cl. ...................... 73/119 A; 73/116; 73/117.2; 73/117.3; 73/118.1; 73/119 R

(58) Field of Classification Search .............. 73/119 A, 73/119 R
See application file for complete search history.

(56) References Cited

U.S. PATENT DOCUMENTS 2,733,630 A 2/1956 Saives
4,037,467 A 7/1977 Emerson
4,037,468 A 7/1977 Emerson
4,061,027 A 12/1977 Emerson
4,070,907 A 1/1978 Emerson
4,088,012 A 5/1978 Emerson
4,141,243 A 2/1979 Van Tassel et al.
4,332,163 A 6/1982 Emerson (Continued)

FOREIGN PATENT DOCUMENTS

DE 3817096 12/1988

(Continued)

OTHER PUBLICATIONS

International Search Report dated Mar. 6, 2005, International Application No. PCT/US2005/000245.

(Continued)

*Primary Examiner*—Edward Lefkowitz
*Assistant Examiner*—Freddie Kirkland, III
(74) *Attorney, Agent, or Firm*—Dobrusin & Thennisch PC

(57) ABSTRACT

A method, system and device for analyzing the performance of a fluid discharge device, pursuant to which a fluid discharge device is mounted in a fixture; a discharge monitoring device is located downstream from the fluid discharge device; flow of fluid that is passed at least partially into a fluid discharge device is monitored with the discharge monitoring device by at least one technique that is independent of pressure measurement, such as an optical detection technique; and the proper functioning of the fluid discharge device is ascertained based upon at least one measurement taken by the discharge monitoring device.

20 Claims, 3 Drawing Sheets

U.S. PATENT DOCUMENTS

| | | | |
|---|---|---|---|
| 4,348,894 A | 9/1982 | Emerson et al. | |
| 4,362,052 A | 12/1982 | Heath et al. | |
| 4,453,403 A | 6/1984 | Bussey et al. | |
| 4,497,201 A | 2/1985 | Allen et al. | |
| 4,714,998 A | 12/1987 | Bussey et al. | |
| 5,701,156 A | 12/1997 | Pierce | |
| 6,484,573 B1 * | 11/2002 | Bundock et al. | 73/119 A |
| 6,508,112 B1 | 1/2003 | Verhoeven | |
| 6,510,842 B1 * | 1/2003 | Ismailov | 123/494 |
| 6,874,480 B1 * | 4/2005 | Ismailov | 123/494 |
| 7,080,550 B1 * | 7/2006 | Goris et al. | 73/119 A |

FOREIGN PATENT DOCUMENTS

| | | |
|---|---|---|
| DE | 19904319 | 8/2000 |
| FR | 2719871 | 11/1995 |
| GB | 731539 | 6/1955 |
| JP | 02176542 | 7/1990 |
| JP | 03253762 | 11/1991 |
| JP | 08121288 | 5/1996 |

OTHER PUBLICATIONS www.mcml.com, EUI Injector Calibrator.

Messmethoden fur die Entwicklung ottomotorischer Brennverfahren mit innerer Gemischbildung—XP-001122819, Dr.-Ing. J Geiger, Dipl. Ing. M. Grigo, Dr. Ing. P. Wolters, pp. 225-244.

Entwicklung neuer Methoden zur Analyse von direkteinspritzenden Ottomotoren, XP-002304361, 1999.

Verhaltensstudie ienes Kraftstoffstrahls, XP-00888134, pp. 116-120, 2000.

* cited by examiner

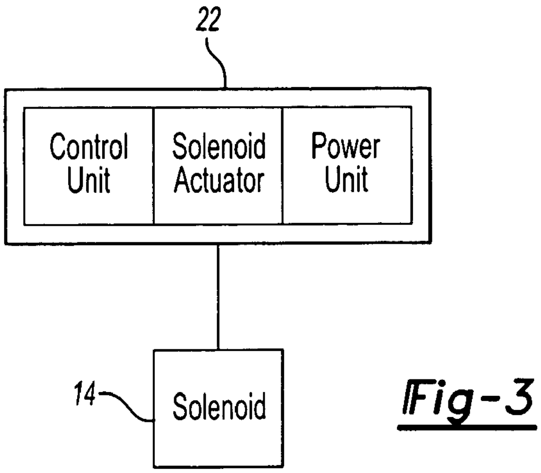

Fig-3

Waveform Programmable Features

| | | | | | | |
|---|---|---|---|---|---|---|
| 1 | Pilot pull-in current | mA | | 9 | Anchor pull-in current | mA |
| 2 | Pilot hold-in current | mA | | 10 | Anchor hold-in current | mA |
| 3 | Pilot pull-in duration | Microseconds | | 11 | Anchor pull-in duration | Microseconds |
| 4 | Pilot duration | Microseconds | | 12 | Anchor duration | Microseconds |
| 5 | Main pull-in current | mA | | 13 | Main delay | Microseconds |
| 6 | Main hold-in current | mA | | 14 | Anchor delay | Microseconds |
| 7 | Main pull-in duration | Microseconds | | 15 | Rate | |
| 8 | Main duration | Microseconds | | 16 | Injectors (1-8) | |

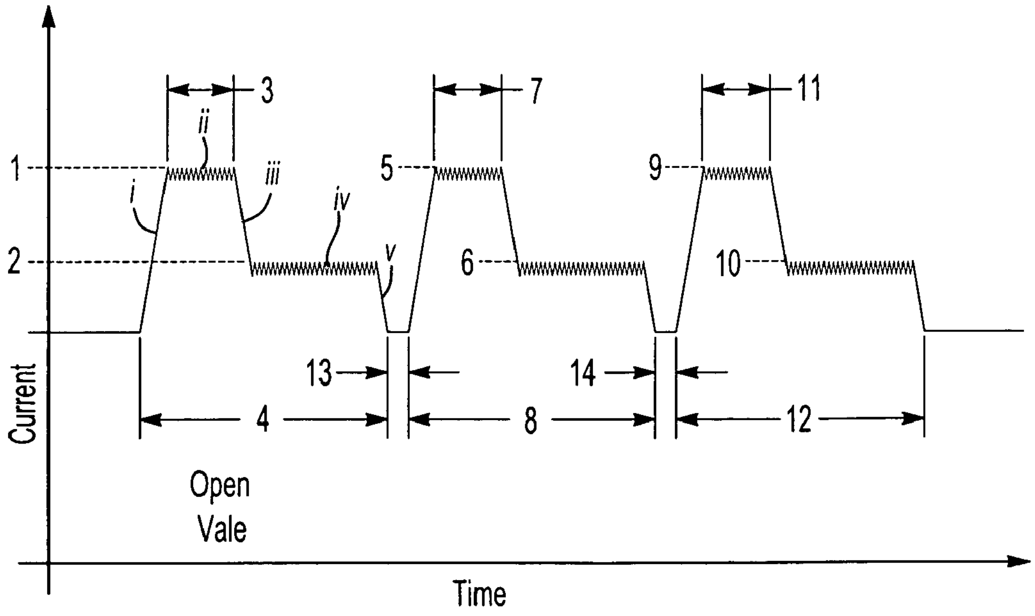

Fig-4

FLUID TEST MACHINE, METHODS AND SYSTEMS

CLAIM OF PRIORITY

The present invention claims the benefit of the filing date of U.S. Provisional Application Ser. No. 60/535,456, filed Jan. 9, 2004 and U.S. Provisional Application Ser. No. 60/602,102, filed Aug. 17, 2004, both of which are incorporated herein by reference for all purposes.

TECHNICAL FIELD

The present invention relates generally to analysis of fluid discharge machine performance and more particularly to testing instruments, systems and methods for the analysis of fuel injector performance.

BACKGROUND

Recent years have seen the advance of many new technologies for dispensing or discharging fluids. Particularly with the advent of improved computer and control systems, it has become possible to controllably meter very small quantities of fluids through a discharge orifice. By way of example, in the transportation field, fuel injection systems have improved such that delivery of fuel for combustion has enabled improvements in fuel efficiency and emissions. This is particularly the case for example in connection with diesel engine systems, where combustion emissions historically have been unattractive.

The increasing demand for efficient fuel injection systems has driven development of increasingly sophisticated fuel injectors. In the manufacture of such injectors there remains a need for quality control to assure that precise manufacturing tolerances and production conditions have been met for proper operation of the injectors. Additionally, as emission and performance requirements placed upon transportation vehicles continue to become more stringent, the aftermarket has seen the need for the efficient diagnosis, repair or retrofitting of existing engine fuel injection systems. In such instances, it is also necessary to assure that injector performance can be readily monitored.

To date, there have been few successful attempts to analyze fuel injectors with testing machines. One commercial example is a machine offered by Michigan Custom Machines, Inc. under the designation HEUI Injector Test Machine. Such a machine has employed a flow meter downstream of a fuel injector for analyzing the discharge of the flow meter. A first electronics system controls generation of pressure upon the fuel injector for causing discharge by the fuel injector. A second electronics system, independent of the first, is associated with the flow meter for data acquisition. The flow meter employed (available from Ono Sokki) includes an enclosed chamber of predetermined volume, into which discharge is directed and monitored by sensing changes of temperature and pressure of the discharge fluid.

It would be attractive to employ a discharge monitoring device that is robust, compact, relatively inexpensive for efficiently and reproducibly monitoring the performance of a fluid discharge device such as a fuel injector. It would also be attractive for a discharge monitoring device to employ an electronics system that communicates directly between the flow meter and any means for causing fuel injector discharge so that performance of the fuel injector can be monitored based upon actual information about the signal delivered for causing fuel injector discharge and the response of the fuel injector to the signal.

SUMMARY OF THE INVENTION

The present invention meets one or more of the above needs by providing an improved method, system and device for monitoring a fluid discharge apparatus. In one aspect, the invention contemplates a method, pursuant to which a discharge monitoring device that is independent of and separable from a fluid discharge device fixture is positioned downstream from a fluid discharge device; flow of fluid that is passed through the fluid discharge device is measured with the discharge monitoring device; and the proper functioning of the discharge device is ascertained based upon at least one measurement taken by the flow meter. One specific example of a fluid discharge device is a fuel injector. An example of a discharge monitoring device is a flow meter, and even more specifically a flow meter that employs for sensing flow an optical detection approach or another form of detection that does not require confining a fluid in a fixed volume for sensing flow.

In a particular aspect, a method is performed including the steps of placing a flow meter downstream of a fuel injector; actuating the fuel injector in a manner that simulates the actual intended operating conditions; measuring flow of fluid that is passed through the fuel injector with the flow meter; optionally controlling the fuel injector actuation and the measurement of flow rate with a common electronic system; and ascertaining the proper functioning of the fuel injector based upon at least one measurement taken by the flow meter. The flow meter employs for sensing flow an optical detection approach or another form of detection that does not require confining a fluid in a fixed volume for sensing flow.

The present invention also contemplates systems and devices that include a discharge monitoring device, and particularly a flow meter, that includes a detector having a detection cell vessel that includes an inlet and an outlet that are both open during detection to permit passage of discharge fluid there through without substantial pressure accumulation; thus, the fluid is not confined within the flow cell. Optionally the flow meter includes a filter or other separations device for reducing build-up of contaminants within the flow meter. Variations of the above allow for the implementation of modular or even portable components, such as a discharge monitoring device that is adapted to interface with an existing test machine (e.g., provided by an entity other than the entity providing the discharge monitoring device), or a discharge monitoring device that is adapted for inclusion in an overall system provided by a single entity.

As can be seen from the above, and gleaned from the following, the present invention offers one or more advantages over existing technologies, such as (without limitation) the ability to provide a robust, compact, relatively inexpensive approach for efficiently and reproducibly monitoring the performance of a fluid discharge device such as a fuel injector. The present invention also improves existing systems by the provision of a compact multi-functional electronics package. When a vessel having an open inlet and outlet is employed, the present invention also offers an advantage of prolonged life expectancy as a result of lower operating extremes.

DESCRIPTION OF THE DRAWINGS

FIG. 3 is a schematic depiction of one exemplary device of the present invention in communication with a solenoid.

FIG. 4 is a schematic depiction of one exemplary wave form of a device of the present invention.

DETAILED DESCRIPTION

The present invention is predicated upon the discovery of improvements for methods, systems and machines for monitoring performance of devices or systems that discharge fluids, such as gasses, liquids, or combinations thereof, with particular application to the monitoring of performance of fuel injectors. Accordingly, though described herein in the context of fuel injector application, the present invention is not intended to be limited thereto, but may be suitably adapted for monitoring performance of other devices or systems that discharge fluids such as, without limitation, irrigation systems, beverage dispensing systems, paint spray systems, fire suppression systems, sprinkler heads, spray nozzles, or the like.

With particular attention to fuel injectors, the invention finds attractive utility in the monitoring of any of a number of different types of fuel injectors, including mechanically actuated (e.g., by a cam drive), electrically or electronically actuated, magnetically actuated, hydraulically actuated, or any combination thereof. Accordingly, the present invention is suitable for and contemplates a step of monitoring a component of a fuel injection system selected from an electromagnetically actuated unit injector, an electrohydraulically actuated unit injector, a common rail fuel injector, a mechanical unit injector, an electronically-controlled fuel injector, a gasoline port injector, a fluid metering valve, a relief valve, a reducing valve, a direct valve, a direct-injection gasoline injector or any combination thereof. The invention is applicable and is employed for use in monitoring injection of any suitable fluid (whether for spark ignition, compression ignition or a combination thereof), such as gasoline, diesel fuel, hydrogen gas, an alcohol, or any combination thereof. Accordingly, the present invention is contemplated as including a step of monitoring performance of a fuel injector for use in a powertrain for automotive vehicles, aircraft, naval vessels, railcars, industrial turbines, farm vehicles, heavy equipment, military vehicles, or otherwise.

The monitoring that is contemplated in accordance with the present invention is directed primarily at analyzing the discharge performance of a fluid discharge device by monitoring the flow of a fluid (e.g., as it passes within a flow cell) from the discharge device, particularly with reference to known information about, for example, the amount of fluid that is provided to the discharge device for discharge, a signal for accomplishing discharge that is delivered to actuate the discharge device, or a combination thereof. Results obtained from such monitoring can be used to gather data about the performance of the discharge device such as whether there are any leaks in the device, whether there are any obstructions in the device, whether the device is responsive to signals transmitted for actuation, the timing performance of the device, any combination thereof or otherwise.

Figure 1:
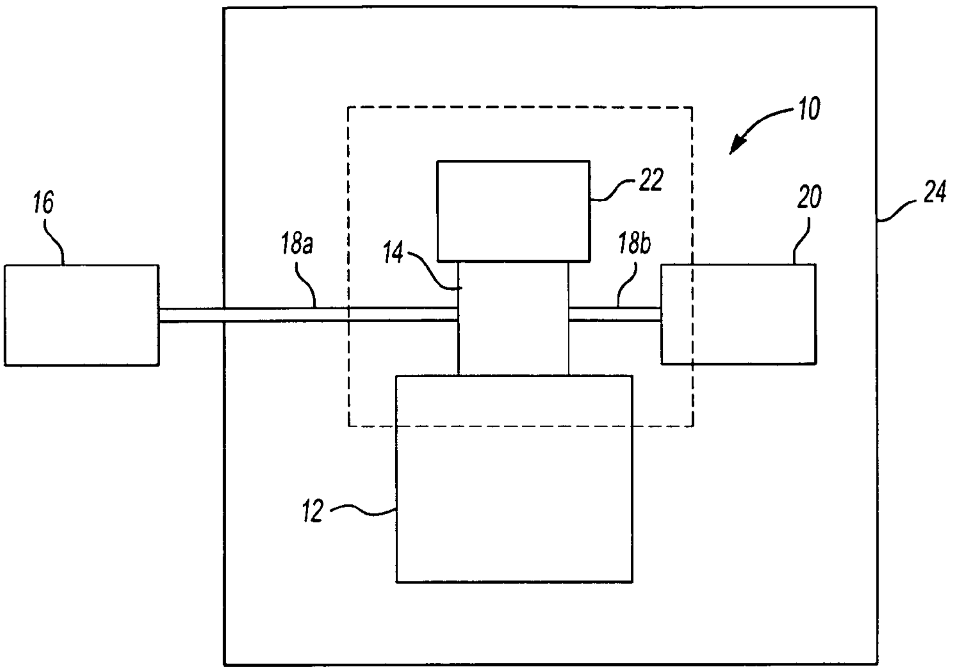
FIG. 1 is a schematic depiction of an illustrative system of the present invention.

With reference to FIG. 1, in general, the present invention contemplates the employment of a system 10 that includes a fixture 12 for receiving a fluid discharge device 14. A fluid source 16 is placed in fluid communication with the fluid discharge device (e.g., via a line, vessel or other structure defining a fluid passageway 18*a*, and possibly including one or more devices for establishing fluid temperature, pressure, flow rate or any combination of the same). With one particular fixture, it is equipped with suitable structure for removably mounting the discharge device in a predetermined location. For example, it may include at least one clamp or other structure for securing the fluid discharge device in the fixture. Further it is contemplated that depending upon the injector that is employed, the fixture may be varied from application to application in any one or more different respects pertaining, for example to size, geometry, fuel ports employed, port locations, seals, or other components that typically will be included in a fixture, permitting the fixture for instance to be in sealed fluid communication with any adjoining fluid passageways.

Downstream of the discharge device there is located at least one discharge monitoring device 20, which may immediately adjoin the fixture or discharge device, or be spaced apart therefrom and connected by a suitable passageway 18*b*, such as shown in FIG. 1. Though possibly formed integrally with the fixture 12, in one particular embodiment of the invention, the discharge monitoring device is removably separable relative to the fixture, and thus can be made portable.

Also associated with the system will be a suitable actuating device 22, which is electronically controllable, programmable or otherwise operable (e.g., via a suitable mechanical drivetrain, such as one including a rotating cam shaft for simulating a cam shaft in an engine, an electrohydraulic drivetrain, an electromagnetic drivetrain, or otherwise). The actuating device is adapted to simulate operating conditions that the fluid discharge device would encounter in its intended service application. Thus, for example, for a system for monitoring fuel injection for an injector for a particular engine, the actuating device will be programmed, controlled or otherwise signally operated for driving an actuator engaged with the fuel injector being tested according to the sequence, timing or other parameters set forth by the engine manufacturer, and resembling those parameters expected in normal vehicle operation.

At least one housing structure 24 typically will be employed to enclose at least a portion of one or more of the fixture 12, fluid discharge device 14, the fluid source 16, the fluid path 18, the discharge monitoring device 20, the actuating device 22 (which for example may include a solenoid driver, a cam and lobe or other suitable structure for simulating the actuation expected in normal operation of the fluid discharge device), or any associated electronics. Thus, by way of illustration in the example of FIG. 1, the fluid source is shown located external of the housing, though it may be located within the housing as well. The housing may be any suitable structure, it may include a single module, or a plurality of separable modules, and in one embodiment it may include one or more transparent panels (depicted in FIG. 1, by way of illustration as the phantom lines) for viewing of any of the foregoing components, such as a panel that permits viewing of the fluid discharge device, its discharge, or both during testing.

Of course, the system is preferably automated and thus may include one or more electronic controls, computers, or other processor devices that optionally are programmable for controlling operation of the system, whether in order to control temperature of test fluid (e.g., which are contemplated to be provided at a temperature ranging from about 15 to 120° C., and more preferably about 25 to 50° C.), pressure of test fluid, flow rate of test fluid, firing of an injector by the actuating device 22, climate control, data acquisition, data output, data analysis, alarm functions, any combination of the foregoing or otherwise.

Referring to FIG. 3, in one embodiment the actuating device 22 includes a device for controlling the driving of a solenoid 14, such as a solenoid associated with a fuel injector. The device is configured and operated to apply power to the solenoid according to suggested manufacturer values, typically established by an Original Equipment Manufacturer (OEM) to achieve a desired result specified by the OEM. In one aspect, the actuating device is a universal device, such that the hardware remains substantially identical from test to test, even when solenoids differ between tests. However, the hardware is suitably programmable so that operation of the different solenoids is possible without the need to swap out control system hardware (e.g., an engine control unit) for simulating the different solenoid driving operations. This allows for the relatively efficient testing of numerous different types solenoids and fuel injectors, with the use of a common hardware.

It is contemplated in one embodiment that a device for the control of a solenoid device (such as a solenoid for a fuel injector, though the present invention contemplates use for driving other solenoids also) is employed. Such a device may include, for example, a first component for actuating a solenoid, a second component for varying a source of power, and a third component that interfaces with the first circuit component, the second circuit component or both for controlling operation of the device. Without limitation, the components may be individual electronic components (e.g., circuits) or they may be combined into one or more electronic components (e.g., circuits) that perform the respective functions above mentioned. For example, it is possible that one or more integrated circuits may be employed. One or more printed circuit boards may be employed. Hard wired circuits are also possible.

Optionally, the first, second and third components are stored together in a housing, e.g., having a transparent or opaque covering that permits access to one or more of the components. Furthermore, it should be appreciated that any of the first, second or third circuits may be combined into an integral unit or circuit. Additionally, any of the first, second or third components may be further subdivided into additional separate sub-components.

In one embodiment, it is desired that the actuating device function to actuate a solenoid in at least two different directions. For example, in a first instance it is contemplated that the device applies a force, via electromagnetically, electrohydraulically induced or otherwise, in a first direction thereby moving the device in that direction. In a second instance, a current may be applied creating an electromagnetic force or otherwise in an opposite direction and moving the solenoid in that direction. It should be appreciated that the application of current in different direction may be accomplished using one or more subcircuits within the first circuit. Alternatively, or in conjunction therewith, the force applied to the solenoid may comprise stored energy in the form of a spring or like devices.

As previously mentioned, in one aspect, control of the solenoid device results from the application of an electrical signal (e.g., by controlling current, voltage or otherwise) to the same. As such, it should be appreciated that the direction, speed, and the position of the solenoid is controllable by the device. Referring to FIG. 4, one exemplary signal waveform (though others are possible as well) is demonstrated for illustrating the application of current to a solenoid with respect to time. The movement of the solenoid is dependent upon the parameters in the application of an electricity source (e.g., current or otherwise). Examples of controllable parameters include (without limitation): duration of power, amplitude of current, the application of current as a function of time, any combinations thereof or otherwise.

Other controllable parameters may include one or more of: pilot pull-in current, pilot hold-in current, pilot pull-in duration, pilot duration, main pull-in current, main hold-in current, main pull-in duration, main duration, anchor pull-in current, anchor hold-in current, anchor pull-in duration, anchor duration, main delay, anchor delay, rate, any combinations thereof, or otherwise.

The device provides for one or more stages of one or more electrical signals to be applied to a solenoid, each of which may be controllably varied based upon user input. It should be appreciated that in each stage, the operational parameters may be different. The application of more than one stage has been found to have advantageous effects upon a solenoid, fuel injector and thus an engine. For example, in newer fuel injectors, particularly fuel injectors associated with diesel engines controlled by an engine control unit (ECU), it has been found by using a fuel injector having more than one stage provides better emission and noise reduction. Consistent therewith, the device of the present invention is adapted to provide one or more stages, each having the capability of providing different signaling parameters to simulate engine control unit operation with a universal ECU simulator, without the need for employing different application specific ECU's for each individual device tested. The ability to program a single system to perform tests across multiple vehicle platforms, according to OEM specifications, thus poses a unique advantage in the ability to reduce test shop hardware.

For example, referring again to FIG. 4, a power graph of a two stage application of power is illustrated, wherein the associated solenoid valve is open during a substantial portion of time. In this two stage application, initial power parameters are applied to the solenoid followed by a subsequent application of power parameters. This graph may be divided into five steps: i) the time dependent change in power to the cylinder, ii) substantial steady state power at a first stage, iii) time dependent change in power (e.g., to an engine cylinder), iv) substantial steady state power at a second stage, and v) time dependent change in power (e.g., to the engine cylinder). In this configuration, these five steps comprise one example of cyclical firing of a fuel injector.

While the change in steady state power (e.g., the time dependent changes in power) may be the result of a reduction in power to the solenoid from a first level to a subsequent level, it should be appreciated that the device is configured to actively reduce the power being applied to the solenoid. For example, between the first and second steady state power stages and/or after the second steady state power stage, the device actively reduces the power level applied to the solenoid, as oppose to allowing for dissipation of the current from the solenoid inducers. Preferably, this active inducement is preformed by the first component.

It should be appreciated that the device is adapted to be used with numerous different solenoids having different power requirement. Furthermore, it should be appreciated that the device may also be used also with solenoids having different power requirements during operation. For example, fuel injectors function according to a predetermined application of power, which often varies between fuel injectors and operation cycle of the fuel injectors, e.g., see the step application of power of FIG. 4. Accordingly, with the ability of the present invention to control the application of power, the present invention allows for manipulation of fuel injectors according to the specification of the OEM. This is most advantageous when testing the fuel injectors for performance.

Consistent with the applicability to different solenoids, the device may further include software that allows for power parameters to be programmed according to manufacture criteria. Preferably, the software work in conjunction or is integrated with the third circuit. The software may provide for the input or modification of power parameters, preferably using a suitable user interface. Alternatively, the device may be in communications, via the Internet, network or otherwise, with another device for the inputting the parameters for a specified solenoid. By way of example, it is contemplated that the actuating device 22 is suitably programmed into electronic memory with data unique to each of a number of different solenoids (e.g., fuel injector solenoids). Before testing a particular solenoid, the data associated with the solenoid is retrieved from memory and is employed to activate the solenoid.

In a most preferred embodiment, the device further includes a library of power parameters for different solenoids. In such a configuration, the user can select a solenoid, via a user interface, and one to all of the power parameter are automatically entered. Thereafter, upon initiation of the device, power is applied to the solenoid according to OEM suggested values. Preferably, this process may be repeated for numerous different solenoids with little to no physical change in hardware. More preferably, this allows for the testing of numerous different types of fuel injectors using a single testing system and the device which may or may not be integrated therewith.

It should also be appreciated that the operating parameters for a specific solenoid may be fixed or adjusted to simulate different operating conditions. This may provide for a broader comparison of test results to be compared with known or expected performance values.

As discussed previously, in one preferred application, the actuating device 22 is used in conjunction with a testing system for fuel injectors as disclosed herein, or otherwise. For example, the device is used to test fuel injectors for diesel engines. In application, the device is in communication with the testing system for determining a firing sequence of the fuel injector, e.g., the application of power. The determination may be based on mechanical sensors, timing devices, control system of the testing system, or otherwise. Furthermore, the application of power is based upon predetermined power parameters or alternatively, based upon default power parameters.

However, the use of actuating device or components thereof (such as the first, second and third electronic components described previously) may be employed for actuating solenoids that are not part of a fuel injector (e.g., door lock solenoids, ignition solenoids, or any other solenoids that may or may not be associated with an automobile). Accordingly, the present invention also contemplates a method of controllably actuating a solenoid such as for testing the solenoid under simulated operating conditions, including steps of: A) controllably actuating the solenoid, B) controllably varying a power source to the solenoid; and C) comparing measured performance of the solenoid with a predetermined performance valued for the solenoid.

Any of a number of other components may optionally be included in the system including, for example, a climate control system, a vapor recovery device, a timing measurement device, a recycling system for the test fluid, one or more sensors (e.g., temperature sensor, pressure sensor, or the like), a loading crane, and alarm system for monitoring operation of the system, a data acquisition system, a peak injection pressure measurement system (e.g., used in a step of monitoring a peak injection pressure for a mechanically actuated discharge device), or any combination thereof.

Though others are also possible, one possible timing device preferably will be capable of measurements as precise as within about 0.1 microsecond, and preferably will have a full range of about 10 milliseconds. An example of one illustrative timing device that might be employed is a Timing Module 3.1 available from Michigan Custom Machines under the designation 1327-UTM. Optionally, the timing device will be universal and configured to be triggered by any of a variety of signals such as rising or lowering edges, external or internal triggers, or combinations thereof. Further, it is contemplated that the timing device will be able to run synchronously or asynchronously relative to data collection by a computer or other processor associated with a data acquisition system. It will be appreciated that the timing device may also have suitable electronics that upon sending a signal to actuate an injector will simultaneously trigger operation of the timing device.

Examples of numerous of the above components and other suitable components for the systems of the present invention, will be recognized by the person skilled in the art, particularly when taking into account existing commercially available systems such as the HEUI or EUI Injector test system, available from Michigan Custom Machines, Inc. (Farmington Hills, Mich.), under the designation HEUI or EUI Injector test machine.

Figure 2:
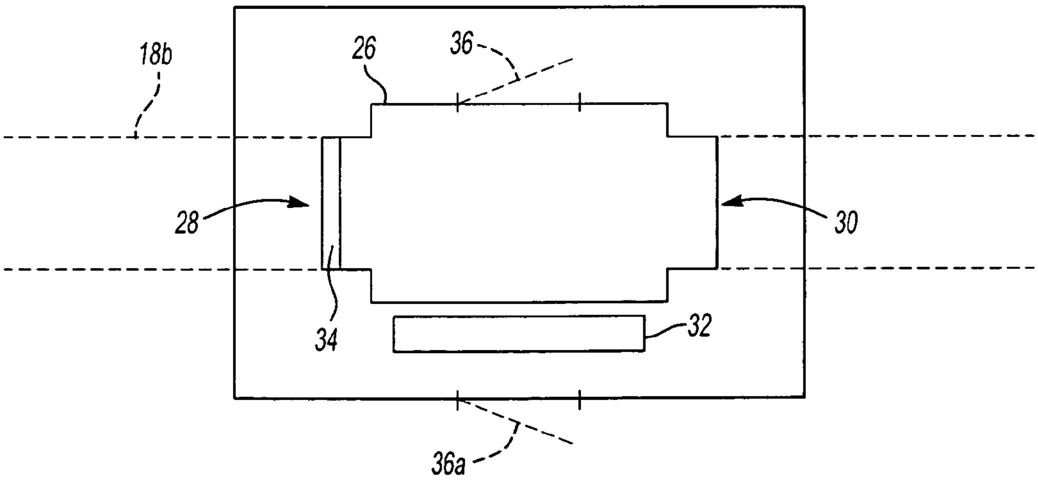
FIG. 2 is a schematic depiction of an illustrative flow cell in accordance with the present invention.

Turning to FIG. 2, in a particular aspect of the present invention, the system includes as the discharge monitoring device 20 a device that is adapted to receive any fluid discharged by the fluid discharge device 14 (and thus it may include one or more suitable seals and fittings for securing it downstream of the fluid discharge device 14) and monitor the fluid that is passed through a flow cell 26 that includes at least one inlet 28 and at least one outlet 30, and a detector 32 that is in monitoring relation to a fluid that passes through the flow cell 26. It is possible that the inlet and the outlet of the flow cell may be integrated into a single opening. It is also possible that one or both of the inlet and the outlet has a partition that is moveable between an open and closed position for blocking passage of a fluid through the flow cell. It is also possible that the flow cell or associated structure may be configured to include one or more valves, for controlling flow in or out of the flow cell. A pressure relief valve might also be employed. Advantageously, in one particular embodiment, the flow cell is operated to permit passage of fluid therethrough for avoiding pressure buildup that can be potentially deleterious to the detector components and other components. Thus, in one embodiment, the present invention contemplates employment of a detector that monitors fluid flow in the flow cell without regard to changes of pressure in the flow cell. The detector may be located inside of the cell, or external of the cell (e.g., separated by a transparent window). One or more filters or other separation medium 34 may be employed for assisting the prevention of debris buildup in the cell, on the detector or both. In one example, the flow cell, the discharge monitoring device or both also includes a removable access panel (or plug) 36 (36*a*) or the like (shown in phantom in one illustrative opened position) to afford access to the interior of the flow cell. In this manner, a step of removing debris from the flow cell interior may be employed without requiring complete disassembly of the system.

An example of one preferred detector is a detector that operates free of a pressure transducer, and more particularly detects by an optical technique, a sound detection technique, an electrical property technique, a chemical reaction technique or any combination thereof. Particular examples of detectors include infrared thermography detectors, imaging detectors, light scatter detectors, impedance detectors, optical detectors, magnetic detectors, electromagnetic detectors, a laser-Doppler anemometer detector, a detector pursuant to which signal detection is accomplished by light interruptions of a photo emitter/detector device, any combination thereof, or by the following types of detectors: Zeutsch Method detectors or positive displacement.

An example of a laser-Doppler anemometer flow meter that may be employed in accordance with the teachings of the present invention is provided in U.S. Pat. No. 6,510,842, the teachings of which are hereby incorporated by reference.

As appreciated from the above, it is possible that detection is achieved by treating the fluid with a suitable reagent or other additive for introducing a marker that can be detected by the detector, such as a fluorescing agents that can be detected by a suitable detector.

It will be appreciated from the above that one example of a detector will employ a laser for detection. In such instance, particularly in applications where the discharge monitoring device is desired to be portable, it will be desirable to house the laser generator in a suitable housing that is generally resistant to shock and vibration typically encountered from repetitive cycling of the discharge device under test. For example, the laser generator housing (or housing for other sensitive components of a discharge monitoring machine) might include a plastic foam support, a spring suspension or other suitable damping structure for the laser generator, and may alternatively or additionally include one or more wheels, handles, or other structure to facilitate transport of it between locations.

In one embodiment the size of the discharge monitoring device is relatively compact, preferably less than about 10 cubic feet, more preferably less than about 5 cubic feet and still more preferably less than about 3 cubic feet.

Operation of the systems in the present invention will typically be automatic or semiautomatic. Accordingly, it is contemplated that one or more suitable control systems, computer systems, or other electronic signaling systems will be employed for operation of the components herein, and particularly the actuating device, the discharge monitoring device and any other data acquisition component. In one particular embodiment, both of the actuating device and the discharge monitoring device are operated by one or more common electronic components, or by independent electronic components that each interface with a common electronic component. In either instance, the electronic components may be housed within the system housing, external thereof or both, and may employ wires for signaling, wireless signaling or both. Preferably, the electronics will communicate with at least one computer, a handheld device (e.g., personal digital assistant, remote telemetry device or the like), or other suitable electronic device by which a user can enter commands, program, retrieve data, store data, output data, or any combination thereof. Optionally one or more of the electronic components associated with the systems or components thereof of the present invention may include a security device that requires a user to enter a passcode, scan a bar code, swipe an encoded card, employ a radiofrequency identification device or other suitable device to gain access to the system or component thereof. The methods of the invention thus also include a step of performing an accessing operation using a security device, such as described.

As can be appreciated from the above, testing in accordance with the present invention will typically include steps of mounting a fluid discharge device in a fixture; placing a discharge monitoring device downstream from the fluid discharge device; measuring flow of fluid that is passed at least partially into a fluid discharge device with the discharge monitoring device by at least one technique selected from an optical detection technique, a sound detection technique, an electrical property technique, a chemical reaction technique or any combination thereof; and ascertaining the proper functioning of the fluid discharge device based upon at least one measurement taken by the discharge monitoring device.

A number of variations of such method are possible, among them being the command of the discharge device to perform a sequence of consecutive discharges to resemble splits performed during a single combustion cycle in many existing commercially available injection systems. For example, the discharge device might be commanded to perform a single injection or plural splits (e.g., 2, 3, 4, 5, 6, 7, 8, 9, 10, 11 or more).

The fixtures for use in the present invention are preferably such that they are custom sized or configured for receiving a specific fuel injector. For example, a different fixture might be employed for different fuel injectors each having a different size or configuration relative to another. Accordingly, in one instance it is contemplated that a first fixture will be removed from the system of the present invention and substituted with at least a second fixture for receiving a different fuel injector. In another embodiment, the fixture will remain the same from injector to injector but will be fitted with a suitable adapter that is sized and configured for a particular injector. In this regard, it is contemplated that kits might be provided that include one or more items selected from a fixtures, adapters or both to enable a user to interchange usage of fixtures, filters (or other spraration media), cleaning supplies, tools, calibration equipment (e.g., including or from which reference data can be derived), combinations thereof, or otherwise, for servicing the test system and/or otherwise adapting the test system for testing one or a plurality of different types of injectors. Likewise, a kit might be provided that includes, in addition to, or alternative to, the interchangeable fixture components, software unique for controlling each different injector, The present invention also contemplates the employment of universal usage components. Thus, for example, the system might initially be provided with software for controlling any of a number of different injectors. User access might be restricted to the software for controlling one or more of the injectors. Thus, one method includes requiring a user to purchase rights to access the software for use with other injectors.

The methods of the present invention may also include one or more steps for assuring reliability and reproducibility of operation of the system or any components. One particular approach is to operate the system to obtain data and comparing that data against known reference data for operation of the system under similar conditions. If discrepancies are identified, then the system may be shut down, an alarm or other message generated, or other wise. Of course it is further contemplated that the system will be calibrated (e.g., by adjusting the system and comparing the system against known reference data), whether periodically or upon detection of a malfunction, or otherwise, until discrepancies are removed.

Data acquisition in accordance with the present invention may involve obtaining data on a continuous basis or on an intermittent basis. Single data readings are possible during testing of a particular fluid discharge device as are plural data readings. Averages may be calculated, as may statistical accuracy of the data. For example, a suitable processor may be programmed for receiving the data and performing one or more calculations. Optionally the data is outputted. In some instances, it is possible that the processor will be programmed with pre-determined values against which the acquired data is compared. A signal is generated if a threshold amount is met or not met. The signal might notify the user, such as by activating an audible alarm, a visual display or a combination thereof. Data might be generated or outputted in real time, stored for later retrieval or a combination thereof.

The use of the system of the present invention can be readily incorporated into an in-line or other quality control system for the manufacture of original fluid discharge devices (i.e., testing prior to initial installation of the device into its intended service environment), the re-manufacture of used fluid discharge devices, the repair of broken fluid discharge devices, or a combination thereof. The methods herein thus also contemplate using the discharge monitoring devices for diagnosis of a malfunction, followed by repairing the malfunction, replacing the device or a combination thereof.

Particularly with respect to fuel injector devices, the system herein can be adapted to perform multiple different tests of a fluid discharge device, such as a body leak test, a test indicative of a faulty seal, a test indicative of an obstruction in the device, an upper seat leak test, a lower seat leak test, combinations thereof or otherwise. Additional tests may also be performed upon the devices while using the system of the invention. For example, it is possible that a system will include hardware for monitoring timing of the device, namely a timer that commences timing upon transmission of a signal for actuating the discharge device and concludes timing upon observing emission of the leading end of the discharge from the device.

To further illustrate the present inventions, attention is now directed to a particular aspect of the actuating device 22, in the particular context of its use for actuating a fuel injector. Specifically, it is contemplated that the actuating device will include a device (e.g., a modular device) that signally commands the actuation of the fuel injector by mimicking the operation of an engine control unit as it relates to the firing of the fuel injector.

An example of such a device includes a PFIM device manufactured by Michigan Custom Machine, Inc. Such device is adapted for providing a consumer with a means of firing a diesel fuel injector in a manner that duplicates a vehicle application. Features of this specific, include (for example) PFIM, a combination of at least: i) a programmable waveform through one or more serial ports, ii) OEM waveform duplication, iii) ability to synchronize with camshaft, or to fire asynchronously, iv) the ability to operate on a single voltage, v) a compact, self contained design which is typically not much larger than an OEM controller, vi) an open communication protocol that allows easy interface to machine controls, vii) a software package allows configuration from PC or laptop, viii) the capability to fire up to six injectors in one unit using a specific firing order, ix) multiple units can be connected together as master and slave to fire up to twenty-four injectors, and x) open or shorted injector connection detection.

This PFIM™, or other actuating devices 22, can be used to fire a diesel injector or group of injectors with a precise waveform that is fully configurable by the end user. Synchronization with a cam or crank is possible with several input options such as encoder, once-per-rev or engine timing wheel with sensor. Communication may comprise a serial port using an open protocol. Drivers for Visual BASIC applications are available as well as a configuration tool that allows the real time editing of PFIM control variables. The module is designed to retain parameters in non-volatile memory for simpler applications that require infrequent configuration and no communication. An injector solenoid can be energized for extended periods of time for performing static seat leak tests.

In application, this PFIM or other actuating devices may be employed in a method that includes one or more steps such as: i) OEM future product development, giving extended experimental range over the production Electronic Control Unit (ECU), ii) test bench integration for endurance testing a complete diesel fuel system, iii) production test machine integration for in-line and end-of-line testing, iv) lab bench or audit bench integration, v) expanded use with custom firmware, or vi) user testing of several injector types and brands on the same equipment. Advantageously, utilization of the actuating device for applications eliminates the need to address proprietary OEM communications protocols on a platform that has been designed and calibrated for precision, exceeding production hardware.

In one aspect, the actuating device (e.g., the PFIM™) is adapted to form a waveform (e.g. as in FIG. 4 or another suitable waveform) for a pilot, main and post injection for a diesel injection cycle. With reference to FIG. 4, Table 1 illustrates an example of one approach to operation of the actuating device. In this illustration, the specification of operation includes: i) operating voltage of 12–24 VDC, ii) maximum number of injectors per FIM are 6, iii) maximum current per injector comprises 30 A, iv) maximum voltage to each injector comprises 110V, v) communication is achieved through a Serial, RJ45 connector, vi) the protocol comprises SAE J1708 style messages and Hall effect switch. Encoder or TTL input for synchronous operation is also contemplated. Of course, it should be appreciated that other approaches are possible. Likewise, while the wave form in FIG. 4 shows two current levels and three splits, it should be appreciated that other configurations are available. For example, there may be a single current level more than two current levels, and/or fewer or more than three current splits. The present invention is not limited to the illustration of FIG. 4.

TABLE 1

| Controlled Feature | Name | Description | Range | Resolution |
|---|---|---|---|---|
| 1, 5, 9 | Pull-In Current | Current driven to the solenoid to initially begin movement of the | 0–30 A | 100 mA |

TABLE 1-continued

| Controlled Feature | Name | Description | Range | Resolution |
|---|---|---|---|---|
| | | actuator. For split injections or different applications, this feature may be individually controlled per split. | | |
| 2, 6, 10 | Hold-in Current | Current delivered to the solenoid once the actuator has moved. This current is only needed to maintain the solenoid engagement. For split injections or different applications, this feature may individually controlled per split. | 0–30 A | 100 mA |
| 3, 7, 11 | Pull-In Duration | The time that the pull-in current is applied to the injector solenoid. For split injections or different applications, this feature is individually controlled per split. | 0.2–100 ms | 1 μsec |
| 4, 8, 12 | Pulse Width | The total "On" time of the injector. For split injections or different applications, this feature may be individually controlled per split. | 0.2 ms to 30 seconds[1] | 1 μsec |
| 13 | Main Delay | This is the delay time between the pilot and main shot. This parameter is only used for split injections. | 0.2–100 ms | 1 μsec |
| 14 | Post Delay | This is the delay time between the main and post shot. This parameter is only used for split injections. | 0.2–100 ms | 1 μsec |
| 15 | Rise Rate | This feature is a function of the characteristics of the solenoid on the injector[2]. The PFIM ™ controls this by changing the applied voltage. | Supply voltage to 110 V | 1 Volt |
| 16 | Fall Rate | This is the rate at which the current is reduced at the injector. This feature is a function of the characteristics of the solenoid on the injector[3]. | Supply voltage + 10 to 110 V | 1 Volt |
| 17 | Chop Amplitude | This is the level of current regulation in the hold state of the waveform. For split injections or different applications, this feature is individually controlled per split. | 100 mA–1 A | 10 mA |
| | Actuation Speed | When firing asynchronously, the PFIM ™ dictate the firing rate. | 100–6000 RPM | 1 RPM |

With reference to Table 1, the skilled artisan will appreciate that operation parameters can be varied as appropriate for each application and in an effort to help avoid solenoid damage. Moreover, in connection with the discussion of table 1, rise rates is defined as the applied voltage divided by the inductance of the injector solenoid (varies by type). Also, Fall rate is defined as the control voltage divided by the inductance of the injector solenoid (varies by type).

Figure 5:
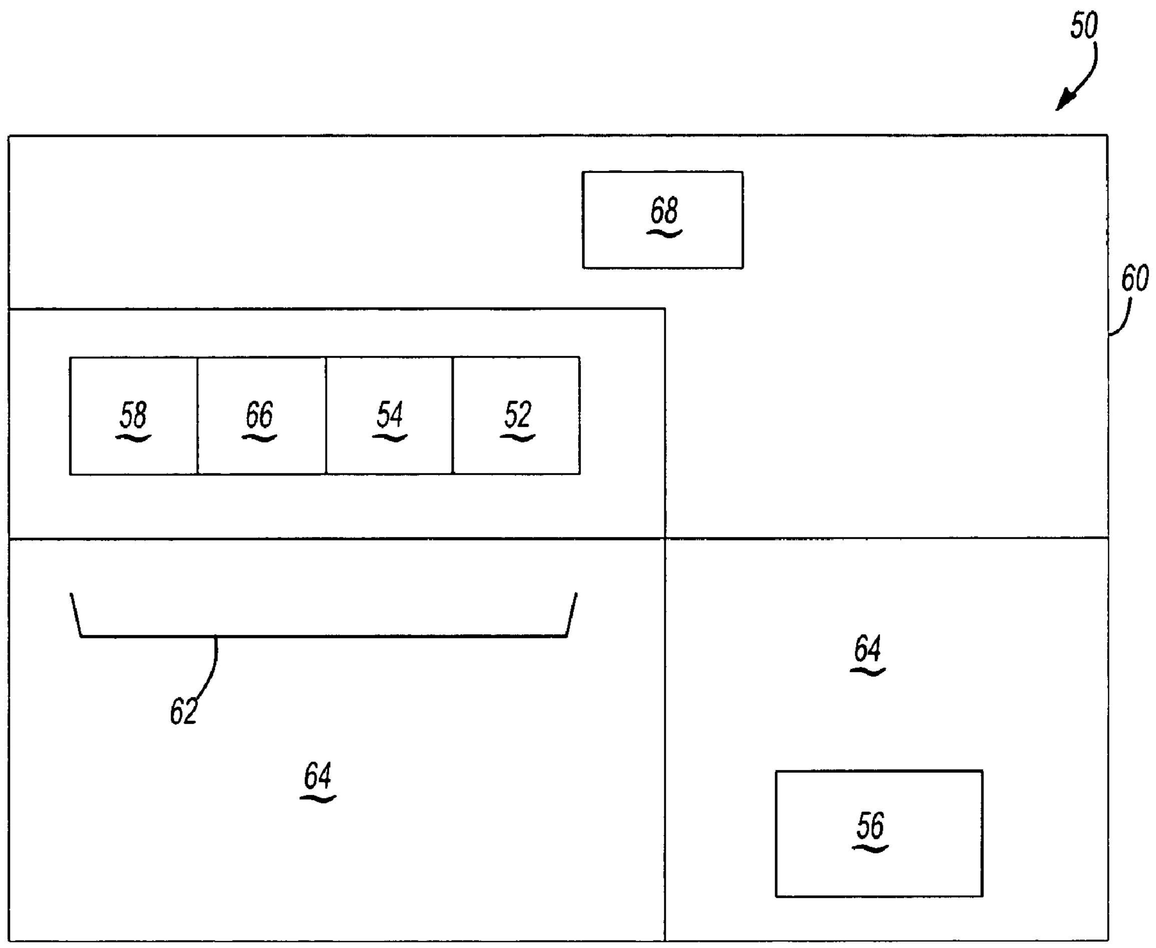
FIG. 5 is a schematic depiction of one exemplary fuel injector test system of the present invention.

By way of example, with reference to FIG. 5 and with particular emphasis on a fuel injector test system 50 (but with the recognition that the system can be adapted for analyzing other fluid discharge devices), another illustration of a specific system according to the present invention is one that includes in an actuating device 52 a powertrain simulator 54 (e.g. a component for mimicking the operation of an engine powertrain, such as operation of a camshaft for actuating a fuel injector), a PFIM 56 (as described above) or a like device for electronically driving the powertrain simulator; and includes in its fluid discharge monitoring device 58 a suitable flow meter (e.g., one that detects flow based upon a response without the need for accumulation of pressure in a test cell).

These components may be housed together (e.g., in a floor standing or surface mounted housing 60), such as one that is about 1 to about 1.7 (e.g., about 1.3) meters wide, about 1 to about 1.7 (e.g., about 1.4) meters tall, and about 0.5 to about 1.5 meters (e.g., about 1 meter) deep. The housing is preferably a welded metal (e.g., about 12 GA) or other fluid resistant material cabinet and frame construction, and includes a drip pan 62 for avoiding spills. One or more optional storage compartments 64 may be included such as for accessories.

Either within the housing or external of it, there is a fluid reservoir (not shown), such as a thermostatically controlled reservoir (to within about +/−1° C.) of a suitable volume (e.g., about 4 to about 50 liters, or more particularly about 38 liters) for passing a fluid through an injector under test under a pressure up to about 30 Bar (e.g., up to about 20.6 Bar), and at a flow rate (which is optionally adjustable by the user) of up to about 25 liters/minute (e.g., up to about 15 liters/minute). The fluid that is passed through the injector may be filtered if desired, such as by passing through at least one filter (e.g., a 3 micron filter or otherwise), and optionally a filter at any transducer.

The system typically will employ a suitable power supply. For example, though others are possible also, it may employ a supply for delivering about 230 V, 3 phase, 60 Hz, 50 amps. The system may also be suitably plumbed with a fluid supply (e.g., a cold water supply that delivers about 3 to about 6 (more particularly about 4.5) liters/minute of water), such as for use to cool one or more components.

The powertrain simulator of the actuating device will include a cam actuation simulation system that may employ one or any combination of at least one precision ground cam, pressure lubrication, at least one tapered roller bearing, or an alarm system for detecting and signaling if lubricant is not being delivered. Thus, for example, power is delivered to a suitable motor for driving a flywheel (e.g., a flywheel for providing about 0.5 to about 2.5, and more particularly about 1.7 kg-$m^2$), for achieving a substantially uniform cam rotation (e.g., within about +/−1 rpm). In this manner, about 5 to about 10 kW (e.g., about 7.5 kW) drive power may be employed.

The powertrain simulator will act upon a test injector that is held securely in place with a suitable fixture, such as an adjustable hydraulic clamp 66, or other clamp capable of delivering a clamping force of about 7500 to about 25,000 N (e.g., about 15,000 N), and can withstand about 15,000 to about 50,000 N (e.g., about 32,000 N) back driving force.

Also associated with the system may be a suitable operator interface, such as a multifunctional display 68 that communicates with at least the actuating device (e.g., it is capable of communicating with and configuring the PFIM for an operator), the fluid discharge monitoring device or both, and thus provides test data output, and possibly also provides the user with a way to input or modify operating parameters, run static tests or both. The operator interface desirably will be configured to allow the operator to input a plurality of different operating parameter sets (e.g., as many as ten or more), and may also afford the operator the ability to control drive speed, firing angle, pulse width, and/or timing threshold for a plurality of test points (e.g., 5 or more test points). Thus, the system is adapted for manual or automatic cycle test operation. The system may also be configured so that the limits for timing and discharge can be associated with test points, so that PASS/FAIL criteria can be evaluated, particularly on automatic cycles.

One particular system that may be suitably employed or readily adapted for use according to the teachings of the present invention is the Bacharach Calibrator UIC-100, by Bacharach, Inc. (New Kensington, Pa.). Such system, as with others contemplated in the above discussion, particularly offers fuel delivery measurement on the basis of positive displacement with temperature compensation, approximately 0.1 $mm^3$/stroke resolution and accuracy of about +/−0.75% of reading. Moreover, such system provides about 50 kHz response using Piezo technology, with resolution to about 0.1 microseconds and provides live, real-time data with a 5 digit front panel display. It is capable of measuring injectors from the Cummins, Detroit Diesel, Caterpillar, Delphi Diesel and EMD companies.

It will be realized from the above that the system of the present invention can be employed in a variety of methods. For example, it can be employed by an operator for testing a plurality of different injectors from different manufacturers (e.g., with the actuating device is programmed with data to mimic fuel injector operating parameters established by the different manufacturers). It can thus likewise be employed by an operator for testing a plurality of different injectors from the same manufacturer. It can be employed for testing at least one injector under a plurality of different operating parameters. It can be employed in testing of the response of at least one injector to a variation of one or any combination of operating parameters selected from current level, voltage, chop, chop amplitude, rise rate, fall rate, firing angle, or pulse width.

Testing can also be performed using any of a number of methods. For example, one approach may be to actuate a fluid discharge device according to predetermined operating parameters, and then to measure the resulting discharge performance. Another approach may be to establish a desired discharge performance, and then to have the actuating device vary one or more operating parameters until the desired discharge performance is achieved. Another approach may be to continuously or intermittently vary operating parameters over the course of a test and to measure the resulting discharge performance.

The present invention is not confined to combinations with other components provided by the same manufacturer. Rather, it is contemplated that a discharge monitoring device might be provided in accordance with the teachings herein and adapted for retro-fit use with an existing machine, and the invention thus contemplates a method including such retro-fitting. By way of example, one retro-fitting approach would be to retro-fit a test system in accordance with the present teachings for enabling a test system previously incapable of monitoring a fuel injector that performs splits with the capability for monitoring a fuel injector that performs splits.

Data acquisition, controls or other components that are signal dependent may operate from a wired connection, a wireless connection (e.g., an infrared or radiofrequency signal), or a combination thereof.

Unless otherwise stated, references to examples or descriptions of embodiments to the use of “power”, “current”, “voltage”, or the like are not intended as limiting. Alternate energy source or signaling means are contemplated as well for such embodiments, as will be appreciated by the skilled artesian.

It will be further appreciated that functions or structures of a plurality of components or steps may be combined into a single component or step, or the functions or structures of one step or component may be split among plural steps or components. For example, the fixture, the discharge monitoring device, or other components herein might be divided into plural components for performing the functions described. Alternatively, functions performed by one of the components might be split among or performed by other components (e.g., a detector that is mounted on the fixture). The present invention contemplates all of these combinations. Unless stated otherwise, dimensions and geometries of the various structures depicted herein are not intended to be restrictive of the invention, and other dimensions or geometries are possible. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A method for analyzing the performance of a fluid discharge device, comprising the steps of:

a) mounting a fluid discharge device in a fixture;

b) placing a discharge monitoring device downstream from the fluid discharge device;

c) measuring flow of fluid that is passed at least partially into a fluid discharge device with the discharge monitoring device by at least one detection technique that detects based upon an optical response or other response independent of an accumulation of pressure; and d) ascertaining the proper functioning of the fluid discharge device based upon at least one measurement taken by the discharge monitoring device.

2. The method of claim 1 wherein the fluid discharge device is selected from an electromagnetically actuated unit injector, an electrohydraulically actuated unit injector, a common rail fuel injector, a mechanical unit injector, an electronically-controlled fuel injector, a gasoline port injector, a fluid metering valve, a relief valve, a reducing valve, a direct valve, a direct-injection gasoline injector or any combination thereof.

3. The method of claim 1, wherein the detection technique is a technique employing a detector selected from infrared thermography detectors, imaging detectors, light scatter detectors, impedance detectors, optical detectors, magnetic detectors, electromagnetic detectors, a laser-Doppler anemometer detector, a detector pursuant to which signal detection is accomplished by light interruptions of a photo emitter/detector device, any combination thereof, or by the following types of detectors: Zeutsch method or positive displacement type.

4. The method of claim 1, wherein the discharge monitoring device is separable from the fixture.

5. The method of claim 4, wherein at least one of the fixture or the discharge monitoring device is provided for retrofitting an existing machine.

6. The method of claim 1, further comprising dampening vibration of the discharge monitoring device from vibrations occasioned in the region of the fixture.

7. The method of claim 1, further comprising replacing the fixture with a different fixture, incorporating an adapter into the fixture for use of the fixture with a different fluid discharge device or a combination thereof.

8. The method of claim 7, further comprising the step of calibrating the discharge monitoring device by comparison of data acquired from it against at least one known reference value.

9. The method of claim 1 wherein the measuring step is performed on a substantially continuous basis or an intermittent basis.

10. The method of claim 1, wherein the steps (a) (d) are performed on the fluid discharge device prior to initial installation of the device into its intended service environment.

11. The method of claim 1, wherein the steps (a)–(d) are performed on the fluid discharge device after initial installation of the device into its intended service environment.

12. The method of claim 1, further comprising a step of timing the discharge of the fluid discharge device.

13. The method of claim 1, further comprising a step of filtering debris in the discharge monitoring device.

14. The method of claim 1, wherein the fluid discharge device is operated to discharge fluid in a rapid succession of a plurality of discharges.

15. A method for analyzing the performance of a fuel injector, comprising the steps of:

a) placing a flow meter that is independent of a fuel injector fixture downstream from a fuel injector device;

b) measuring flow of fluid that is passed through the fuel injector device with the flow meter that detects based upon a response independent of an accumulation of pressure;

c) ascertaining the proper functioning of the fuel injector device based upon at least one measurement taken by the flow meter.

16. The method of claim 15 wherein the flow meter monitors flow by an optical detection technique.

17. The method of claim 15 wherein the fuel injector device is selected from an electromagnetically actuated unit injector, an electrohydraulically actuated unit injector, a common rail fuel injector, a mechanical unit injector, an electronically-controlled fuel injector, a gasoline port injector, a fluid metering valve, a relief valve, a reducing valve, a direct valve, a direct-injection gasoline injector or any combination thereof.

18. The method of claim 15, wherein the fuel injector device is operated to discharge fuel in a rapid succession of a plurality of discharges.

19. The method of claim 18, wherein the fuel injector device is a fuel injector and it is operated to perform at least 6 splits.

20. The method of claim 15, wherein the steps (a)–(d) are performed on the fuel injector device prior to initial installation of the device into an engine.

* * * * *